United States Patent [19]

Baker et al.

[11] Patent Number: 4,462,836

[45] Date of Patent: Jul. 31, 1984

[54] CEMENT COMPOSITION AND METHOD OF CEMENT CASING IN A WELL

[75] Inventors: Wilford S. Baker, Thibodaux, La.; James J. Harrison, Glenshaw, Pa.

[73] Assignee: Gulf Oil Corporation, Pittsburgh, Pa.

[21] Appl. No.: 466,550

[22] Filed: Feb. 15, 1983

[51] Int. Cl.$^3$ .................... C04B 7/352; C04B 7/353
[52] U.S. Cl. ............................ 106/92; 106/93; 166/293
[58] Field of Search .............. 106/92, 93; 166/293

[56] References Cited

U.S. PATENT DOCUMENTS

| | | | |
|---|---|---|---|
| 2,580,565 | 1/1952 | Ludwig | 106/93 |
| 3,465,824 | 9/1969 | Kucera | 106/93 |
| 3,465,825 | 9/1969 | Hook et al. | 106/93 |
| 3,483,007 | 12/1969 | Hook | 106/93 |
| 3,959,003 | 5/1976 | Ostroot et al. | 106/93 |

Primary Examiner—James Poer
Attorney, Agent, or Firm—Deane E. Keith; Forrest D. Stine; Richard C. Gaffney

[57] ABSTRACT

A novel cement composition for the preparation of a novel aqueous slurry useful in cementing casing in the borehole of a well comprising (1) cement, (2) (a) a hydroxyethylcellulose ether or (2) (b) a mixture of a hydroxyethylcellulose ether and a hydroxypropylcellulose ether, (3) a polysaccharide produced as a result of microbial action and (4) a dispersant.

73 Claims, No Drawings

CEMENT COMPOSITION AND METHOD OF CEMENT CASING IN A WELL

BACKGROUND OF THE INVENTION

1. Field of the Invention

This invention is directed to a novel cement composition for the preparation of a novel aqueous slurry useful in cementing casing in the borehole of a well comprising (1) cement, (2) (a) a hydroxyethylcellulose ether or (2) (b) a mixture of a hydroxethylcellulose ether and hydroxypropylcellulose ether, (3) a polysaccharide produced as a result of microbial action and (4) a dispersant.

2. Description of the Prior Art

After a borehole of an oil or gas well has been drilled, casing is run into the well and is cemented in place by filling the annulus between the borehole wall and the outside of the casing with a cement slurry, which is then permitted to set. The resulting cement provides a sheath surrounding the casing that prevents, or inhibits, communication between the various formations penetrated by the well. In addition to isolating oil, gas and water-producing zones, cement also aids in (1) bonding and supporting the casing, (2) protecting the casing from corrosion, (3) preventing blowouts by quickly forming a seal, (4) protecting the casing from shock loads in drilling deeper and (5) sealing off zones of lost circulation. The usual method of cementing a well is to pump a cement slurry downwardly through the casing, outwardly through the lower end of the casing and then upwardly into the annulus surrounding the casing. The upward displacement of the cement slurry through the annulus can continue until some of the cement slurry returns to the well surface, but in any event will continue past the formations to be isolated.

If the primary cementing of the casing, as described above, does not effectively isolate the formations, it may become necessary to perforate the casing at intervals along its length and then squeeze a cement slurry under high pressure through the perforations and into the defined annulus to plug any channels that may have formed in the cement sheath. Squeezing is an expensive operation that requires bringing perforating and cement service companies back to the well and is therefore to be avoided, if possible.

It is critical in preparing cement compositions useful in cementing casing in the borehole of a well that they be characterized by little or no fluid loss, the presence of little or no measureable free water, a viscosity designed for optimum particle suspension, optimum pumpability, flow properties sufficient to facilitate and maintain laminar and/or plug flow, adequate gel strength to provide thixotropic properties to the slurry when pumping ceases, thickening time tailored or designed to meet field specifications, high compressive strength and substantially no shrinking on setting.

SUMMARY OF THE INVENTION

We have found a novel cement composition particularly suitable for the preparation of a novel aqueous slurry useful in cementing casing in the borehole of a well having the desirable characteristics defined above which comprises (1) cement, (2)(a) a hydroxyethylcellulose ether or (2)(b) a mixture of a hydroxyethylcellulose ether and a hydroxypropylcellulose ether, (3) a polysaccharide produced as a result of microbial action and (4) a dispersant.

The cement, or first, component of the novel cement composition suitable for preparing the novel aqueous slurry can be any of the cements defined in API, Spec. 10, First Edition, page 6, or in ASTM, C150. Examples of these cements are those defined by the API Classes "A" through "J". Of these we prefer to employ those defined in API Classes "H" and "J".

In order to obtain the novel cement composition defined and claimed herein, a second component comprising (a) hydroxyethylcellulose ether or (b) a mixture of hydroxyethylcellulose ether and hydroxypropylcellulose ether is required. In a preferred embodiment, the viscosity of said hydroxyalkylcellulose ethers is maintained within well-defined and significant limits. Viscosity is empirically related to the molecular weight of the hydroxyalkylcellulose ether, and it is the molecular weight of the hydroxyalkylcellulose ether which is the critical factor. The viscosity measurement is merely a convenient way of defining the molecular weight. In addition, the hydroxyalkylcellulose ethers will desirably possess a specified degree of substitution and a specified molar substitution.

As pointed out above, the second component can contain hydroxyethylcellulose ether alone or a mixture of hydroxyethylcellulose ether and of hydroxypropylcellulose ether. In our preferred embodiment, the second component will consist substantially solely of hydroxyethylcellulose ether. If hydroxypropylcellulose ether is also used in combination with hydroxyethylcellulose ether, it can be present in any amount up to about 50 weight percent, based on the total weight of said hydroxyalkylcellulose ethers, but preferably will be present in an amount ranging from about five to about 20 weight percent, based on the total weight of said hydroxyalkylcellulose ethers.

As pointed out above, the viscosity of the hydroxyalkylcellulose ethers used herein is maintained within certain well-defined limits in order to obtain a cement composition having the desired characteristics defined above. In obtaining the viscosity measure required, a selected amount of the hydroxyalkylcellulose ether is dissolved in water at 25° C. and the resulting aqueous solution is measured in a Brookfield viscometer. The viscosity of the hydroxyethylcellulose ether must be above about 200 centipoises when measured in a five weight percent aqueous solution but less than about 6000 centipoises when measured in a one weight percent aqueous solution. In a preferred range the viscosity will be from about 1000 to about 10,000 centipoises when measured in a two weight percent aqueous solution. The critical viscosity of the hydroxypropylcellulose ether must be above about 100 centipoises when measured in a two weight percent aqueous solution, but less than about 10,000 centipoises when measured in a one weight percent aqueous solution. In a preferred range, the viscosity will be from about 1000 to about 3000 centipoises when measured in a one weight percent aqueous solution.

The degree of substitution and the molar substitution of the hydroxyalkylcellulose ethers used herein are also important. By "degree of substitution" we mean the average number of total substituents present per glucose unit, while by "molar substitution" we mean the number of mols of ethylene oxide or propylene oxide that are attached to each glucose unit. The degree of substitution can be in the range of about 0.5 to about 3.0, preferably from about 0.9 to about 2.8. The molar substitution can be in the range of about 0.5 to about 10.0, preferably from about 1.0 to about 6.0. It is understood that the hydroxyethylcellulose ether can also carry some propylene oxide substituents and, similarly, hydroxypropylcellulose ether can also carry some ethylene oxide units.

The third necessary component of the novel cement composition, and of the novel aqueous slurry prepared therefrom, is a polysaccharide (or mixtures of polysaccharides), preferably extracellular polysaccharides, produced as a result of microbial action, which polysaccharides are generally hydrophilic colloidal materials. A polysaccharide is a polymer made up of repeating units of monosaccharides. The latter are the simplest members of the carbohydrate family and can be defined by the formula $C_nH_{2n}O_n$ wherein $n \geq 4$, with n generally being below 10. These polysaccharides can have molecular weights in the range of about 10,000 to about 10,000,000, but generally will be in the range of about 1,000,000 to about 3,000,000. By "polysaccharides" we mean to include unsubstituted as well as substituted derivatives thereof, examples of which include hydroxyalkyl substituents, such as hydroxyethyl and hydroxypropyl, carboxymethyl and other ethers. Examples of polysaccharides that can be employed herein include those produced as a result of the microbial action of such bacteria as xanthomonas begoniae, xanthomonas campestris, xanthomonas caratae, xanthomonas hederae, xanthomonas incanae, xanthomonas malvacearum, xanthomonas oryzae, xanthomonas papavericola, xanthomonas phaseoli, xanthomonas pisi, xanthomonas translucens, xanthomonas vasculorum, xanthomonas vesicatoria, scleratium glucanicum, alcaligenes faecalis, azotobacter vinelandii, aureobasidium pullulans, beijerinckia indica, etc. Of these we prefer to use polysaccharides produced as a result of action from the bacterium xanthomonas campestris. We have found the material known as xanthan gum to be particularly effective. The material used in combination with the above bacterium to produce the desired polysaccharides can be any material capable of interacting with such bacterium. For example, such material can include a medium containing glucose, an organic nitrogen source, such as corn steep liquor or distillers dry solubles, dipotassium hydrogen phosphate, and appropriate trace elements, etc. The above polysaccharides and their preparation are well known in the art. See, for example, Encyclopedia of Chemical Technology, Volume 15, pages 439 to 458, Third Edition.

The fourth component required in the novel cement composition herein is a dispersant. By "dispersant" we mean to include any anionic surfactant, that is, any compound which contains a hydrophobic (for example, any hydrocarbon substituent, such as alkyl, aryl or alkaryl group) portion and a hydrophilic (for example, any negatively-charged moiety, such as $O^-$, $CO_2^-$ or $SO_3^-$) portion. We prefer to use sulfonic acid derivatives of aromatic or aliphatic hydrocarbons, such as naphthalene sulfonic acid formaldehyde condensation product derivatives, such as their sodium or potassium salts. Examples of dispersants that can be used include polynaphthalene sulfonates available from Dow Chemical Company, such as "TIC I"; lignosulfonates; CFR-2, a sulfonate dispersant sold by the Halliburton Company; sodium naphthalene sulfonate formaldehyde condensation products, such as DAXAD 19 of W. R. Grace Company, Lomar D of Diamond Shamrock Company, D 31 of B. J. Hughes Company, and D 65 of Dowell Company; and potassium naphthalene sulfonate formaldehyde condensation products, such as DAXAD 11 KLS of W. R. Grace Company.

Other additives conventionally added to cement compositions useful in cementing casings in the borehole of a well can also be added to the novel cement compositions herein in the amounts normally used. These additives can include, for example, (1) cement accelerators, such as calcium chloride, sodium chloride, gypsum, sodium silicate and sea water; (2) light-weight additives, such as bentonite, diatomaceous earth, gilsonite, coal, perlite and pozzolan; (3) heavy-weight additives, such as hematite, ilmenite, barite, silica flour and sand; (4) cement retarders, such as lignins, calcium lignosulfonates, CMHEC (carboxymethylhydroxyethylcellulose ether) and sodium chloride; (5) additives for controlling lost circulation, such as gilsonite, walnut hulls, cellophane flakes, gypsum cement, bentonite-diesel oil and nylon fibers; and (6) filtration control additives, such as cellulose dispersants, CMHEC and latex. In addition, other additives such as KCl can also be used.

Table I below defines the amounts of hydroxyalkylcellulose ethers, the defined polysaccharide and dispersants that can be used herein to prepare the novel cement composition based on the weight of the dry cement.

TABLE I

|  | Weight Percent | |
| --- | --- | --- |
|  | Broad Range | Preferred Range |
| Total Hydroxy-alkylcellulose ether | 0.01 to 0.6 | 0.1 to 0.5 |
| Polysaccharide | 0.01 to 0.6 | 0.02 to 0.2 |
| Dispersant | 0.01 to 3.0 | 0.1 to 2.0 |

The above novel cement composition is merely mixed with any suitable aqueous material used in preparing aqueous cement slurries, for example, water itself, to prepare the novel aqueous cement slurry possessing the desired characteristics; for example having the desired density and setting and pumping properties. Mixing of the novel cement composition with the aqueous solution can be effected in any suitable or conventional manner, for example, by mixing the dry ingredients before addition to the aqueous solution or by adding the individual components to an aqueous slurry of cement.

Table II below defines the amounts of each of the components that can be used to prepare the novel aqueous cement slurry claimed herein, based on the weight of the dry cement.

TABLE II

|  | Weight Percent | |
| --- | --- | --- |
|  | Broad Range | Preferred Range |
| Total Hydroxy-alkylcellulose ether | 0.01 to 0.6 | 0.1 to 0.5 |
| Polysaccharide | 0.01 to 0.6 | 0.02 to 0.2 |
| Dispersant | 0.01 to 3.0 | 0.1 to 2.0 |
| Water | 25 to 80 | 35 to 70 |
| KCl* | 0 to 7.0 | 1.0 to 5.0 |

*Based on the weight of the water.

The weight ratio of dispersant (D) to total hydroxyalkylcellulose ether (P) should be in the range of about 10:1 to about 1:5, preferably from about 5:1 to about 1:1.

Cement tests were carried out in the laboratory to evaluate the cement slurries prepared in accordance with our invention. The practices and procedures defined in API Spec 10, First Edition, January 1982, were followed. Appropriate bottom hole circulating temperatures (BHCT), bottom hole static temperatures (BHST) and pressures were chosen for the tests. The BHCT applies for fluid loss, free water, total thickening time, viscosity, initial gel strength and yield point tests. BHST applies for compressive strength and hesitation squeeze tests. Satisfactory results from these tests will fall within the following specifications.

The fluid loss of the above slurry, as determined in accordance with API Spec 10, First Edition, January 1982, pages 72–74, will always be below about 500 milliliters at 1000 psi (6894 kPa), generally below about 200 milliliters at 1000 psi, most generally in the range of about five to about 100 milliliters at 1000 psi.

The amount of free water in the cement slurry, as determined in accordance with the above API Spec 10, page 18, will always be below about 1.4 weight percent, generally in trace amounts (the top of the resulting cement will be moist), but most generally will be free of water (the top of the resulting cement will be dry and crusty).

The total thickening time of the slurry, as determined in accordance with the above API Spec. 10 pages 22–31, can easily be adjusted to meet field requirements. This can be, for example, within the range of about two to about eight hours, generally from about three to about eight hours, but most preferably about four to about six hours.

The viscosity of the slurry, as determined in accordance with API Bulletin RP 13B, Sixth Edition, April 1976, page 6, will be in centipoises at 300R in the range of about 30 to about 400, generally from about 50 to about 300, but most generally from about 100 to about 250.

The initial gel strength of the slurry, as determined in accordance with the above API Bulletin RP 13B, page 6, in pounds per 100 square feet at 3 RPM, will be about two to about 50 pounds/100 square feet (0.1 to 2.5 kg/m$^2$), generally about six to about 30 pounds/100 square feet (0.3 to 1.5 kg/m$^2$), but most generally from about 10 to about 20 pounds/100 square feet (0.5 to 1.0 kg/m$^2$).

The yield point of the slurry as determined in accordance with the above API Bulletin RP 13 B, page 6, in pounds/100 square feet will be in the range of about 1 to about 250 pounds/100 square feet (0.05 to 12.5 kg/m$^2$), generally from about five to about 150 pounds/100 square feet (0.25 to 7.5 kg/m$^2$), but most generally from about 8 to about 100 pounds/100 square feet (0.4 to 5.0 kg/m$^2$).

The compressive strength of the cement, upon setting, as determined in accordance with the above API Spec 10, page 49, will always be above about 1500 psig (10,342.5 kPa), generally in the range of about 2000 to about 8000 psig (13,790 to 55,160 kPa), but most generally from about 2000 to about 4000 psig (13,790 to 27,580 kPa).

We have found that, in general, the compressive strength of the cement prepared in accordance with this invention is independent of the gel strength.

The novel cement slurry herein can then be pumped downwardly into the casing that has been suspended in the borehole of a well and then circulated upwardly into the annulus surrounding the casing. Circulation can continue until the slurry fills that portion of the annular space desired to be sealed and can continue until the cement slurry returns to the surface. In one embodiment wherein the novel cement slurry herein can be utilized, the borehole can be slanted from the vertical. The cement slurry is then maintained in place unitl the cement sets. The cement so produced will result in a strong, continuous, unbroken bond with the outside surface of the casing and with the wall of the formation.

In a preferred method of cementing casing in a well employing the cement composition of this invention, a lead-scavenger is displaced upwardly through the annulus surrounding the casing and followed by the novel aqueous cement slurry prepared in accordance with the invention herein, for convenience in this description referred to as "pay slurry". An example of a lead-scavenger cement slurry that can be used herein is a gel cement slurry containing, for example, from about 10 to about 20 weight percent bentonite, based on the weight of the cement, and about 0 to about 1.0 weight percent of a lignosulfonate retarder. The cement and bentonite are then mixed with sea water, or an aqueous solution containing about three weight percent sodium chloride, to form a slurry having a density of about 11.0 to about 14.0 pounds per gallon (1320 to 1680 grams per liter). The lead-scavenger cement slurry has a low viscosity which results in turbulent flow of the slurry through the annulus at substantially lower velocities than are necessary for turbulent flow of the pay slurry. The lead-scavenger slurry removes drilling mud and the drill cuttings which are present between the wall of the borehole and the outer surface of the casing. The pay slurry of the cement follows the lead-scavenger slurry into the annulus and is held in place until the cement sets. The annular flow patterns, reported in Reynolds No. values for the scavenger slurry are generally maintained within the range of about 2000 to about 4000, preferably about 2500 to about 3500, while those for the pay slurry are maintained within the range of about 400 to about 1900, preferably about 500 to about 1800.

DESCRIPTION OF PREFERRED EMBODIMENTS

A number of cement slurries were prepared from a number of cement compositions and tested. Each cement slurry was prepared using 800 grams of cement. In each of Runs Nos. 1 to 14 and 19 to 23, the cement used was a Class H cement; in Run No. 15, a Class G cement; in Run No. 16 a Class C cement; and in Run Nos. 17 and 18, a Class J cement. In each run, except Run No. 13, fresh tap water was used in preparing the cement slurries. In Run No. 13 the water used was salt water from the Gulf of Mexico. The hydroxyethylcellulose ether used herein had a molar substitution of 2.5 and a viscosity of about 4500 to about 6500 centipoises when measured in a two weight percent aqueous solution. The hydroxypropylcellulose ether used had a molar substitution of about 4.0 and a viscosity of about 1500 to about 2500 centipoises when measured in a one weight percent aqueous solution. The amounts of each of the components present, except for KCl And CaCl$_2$, are based on the weight of the dry cement. The amounts of KCl and CaCl$_2$ are based on the amount of water in the slurry. The cement slurries so prepared and the test results based thereon are further defined below in Table III.

TABLE III

| Run No. | % Water | % HEC[1] | % HPC[2] | % Dispersant[3] | % KCl | % Polysaccharide[4] | % CMHEC[5] | Other Additives | % of Other Additives | D/P[6] | BHCT °F. | BHCT (°C.)[7] | Fluid Loss (ml) | % Free Water | API Viscosity cp 300R |
|---|---|---|---|---|---|---|---|---|---|---|---|---|---|---|---|
| 1 | 46 | 0 | 0 | 1.0 | 5 | 0 | 0 | 0 | 0 | 0 | 152 | (66.7) | 928 | 11 | 20 |
| 2 | 40 | 0.34 | 0.06 | 1.089 | 3 | 0 | 0.08 | 0 | 0 | 2.27 | 201 | (93.9) | 52 | 0 | * |
| 3 | 40 | 0.34 | 0.06 | 1.089 | 3 | 0.08 | 0.08 | 0 | 0 | 2.27 | 201 | (93.9) | 54 | * | * |
| 4 | 46 | 0.2975 | 0.0525 | 1.0 | 3 | 0.05 | 0 | 0 | 0 | 2.78 | 152 | (66.7) | 71 | 0 | * |
| 5 | 46 | 0.36 | 0 | 0.99 | 0 | 0.075 | 0.075 | 0 | 0 | 2.27 | 188 | (86.7) | 72 | 0 | 231 |
| 6 | 46 | 0.36 | 0 | 0.99 | 3 | 0.075 | 0.075 | 0 | 0 | 2.27 | 188 | (86.7) | 76 | 0 | 194 |
| 7 | 38 | 0.36 | 0 | 0.99 | 0 | 0.075 | 0.075 | 0 | 0 | 2.27 | 188 | (86.7) | 42 | Trace | 340 |
| 8 | 38 | 0.36 | 0 | 0.99 | 3 | 0.075 | 0.075 | 0 | 0 | 2.27 | 188 | (86.7) | 52 | Trace | 370 |
| 9 | 40 | 0.395 | 0 | 1.09 | 3 | 0.082 | 0.082 | 0 | 0 | 2.27 | 201 | (93.9) | 38 | 0 | 338 |
| 10 | 40 | 0.395 | 0 | 1.09[8] | 0 | 0.082 | 0.082 | 0 | 0 | 2.27 | 201 | (93.9) | 50 | Trace | 340 |
| 11 | 46 | 0.48 | 0 | 1.32 | 0 | 0.10 | 0.10 | D-28[9] | 0.2 | 2.27 | 256 | (124.4) | 105 | Trace | 375 |
| 12 | 46 | 0.18 | 0 | 0.50 | 3 | 0.038 | 0.038 | 0 | 0 | 2.27 | 100 | (37.8) | 143 | 0 | 163 |
| 13 | 46[10] | 0.18 | 0 | 0.50 | 0 | 0.038 | 0.038 | 0 | 0 | 2.27 | 100 | (37.8) | 197 | 0 | 198 |
| 14 | 46 | 0.18 | 0 | 0.50 | 0 | 0.038 | 0.038 | CaCl₂ | 3.0 | 2.27 | 100 | (37.8) | 334 | Trace | 169 |
| 15 | 44 | 0.24 | 0 | 0.66 | 3 | 0.05 | 0.05 | 0 | 0 | 2.27 | 130 | (54.4) | 438 | Trace | 228 |
| 16 | 56 | 0.24 | 0 | 0.66 | 3 | 0.05 | 0.05 | 0 | 0 | 2.27 | 130 | (54.4) | 234 | Trace | 129 |
| 17 | 53 | 0.36 | 0 | 0.99 | 0 | 0.075 | 0.075 | 0 | 0 | 2.27 | 256 | (124.4) | 263 | Trace | 262 |
| 18 | 53 | 0.48 | 0 | 1.50 | 0 | 0.10 | 0.10 | 0 | 0 | 2.27 | 256 | (124.4) | 235 | Trace | 258 |
| 19 | 46 | — | — | — | 3 | — | — | D-60[11] | 0.75 | — | 100 | (37.8) | 275 | * | * |
| 20 | 46 | 0.24 | 0 | 0.66 | 0 | 0.05 | 0.05 | 0 | 0⁻ | 2.27 | 200 | (93.3) | 127 | Trace | 211 |
| 21 | 46 | 0.36 | 0 | 0.99 | 0 | 0.075 | 0.075 | 0 | 0 | 2.27 | 200 | (93.3) | 56 | Trace | 362 |
| 22 | 46 | 0.36 | 0 | 0.99 | 0 | 0.075 | 0.075 | 0 | 0 | 2.27 | 230 | (110) | 60 | Trace | 265 |
| 23 | 46 | 0.42 | 0 | 1.155 | 0 | 0.0875 | 0.0875 | 0 | 0 | 2.27 | 290 | (143.3) | 56 | Trace | 330 |

| Run No. | Gel Strength #/100 ft² (0.05 kg/m²) 3R | Yield Point #/100 ft² (0.05 kg/m²) 300R-(600R-300R) | Total Thickening Time, Hrs.: Min | Compressive Strength #/in² (6.895 kpa) 48 Hrs. |
|---|---|---|---|---|
| 1 | 3 | −4 | * | * |
| 2 | * | * | 5:18 | 2970[12] |
| 3 | * | * | 5:30 | 3384[12] |
| 4 | * | * | * | 2450[13] |
| 5 | 11 | 107 | 5:02 | 3075[14] |
| 6 | 9 | 80 | 5:13 | 3175[14] |
| 7 | 38 | 250 | 4:45 | 4213[14] |
| 8 | 25 | 180 | 3:00 | 4400[14] |
| 9 | 19 | 151 | 3:27 | 2572[15] |
| 10 | 32 | 165 | 2:43 | 2638[12] |
| 11 | 26 | 180 | 6:00+ | * |
| 12 | 7 | 46 | 5:20 | 3075[16] |
| 13 | 8 | 6 | 4:26 | 2800[16] |
| 14 | 20 | 54 | 4:19 | 2600[16] |
| 15 | 10 | 66 | 5:05 | 4000[17] |
| 16 | 19 | 35 | 2:18 | * |
| 17 | 11 | 119 | 5:38 | * |
| 18 | 11 | 126 | 6:50 | * |
| 19 | * | * | * | * |
| 20 | 7 | 62 | 6:00+ | * |
| 21 | 21 | 199 | 6:00+ | * |
| 22 | 13 | 115 | 6:00+ | * |
| 23 | 14 | 130 | 2:00 | * |

[1] hydroxyethylcellulose ether
[2] hydroxypropylcellulose ether
[3] DAXAD-19, a sulfonate dispersant of W. R. Grace Co.
[4] Xanthan gum produced by Kelco Company as Kelzan XC Polymer, believed to have molecular weight between 1-3 million
[5] carboxymethylhydroxyethylcellulose ether
[6] weight ratio of dispersant to total cellulose ethers in system
[7] corresponds to temperature of circulating fluid at bottom of well
[8] DAXAD 11 KLS, a sulfonate dispersant of W. R. Grace
[9] D-28, a high-temperature lignin of Dowell Co.
[10] sea water from the Gulf of Mexico
[11] D-60, a cement additive of Dowell Co.
[12] BHST of 230° F. (110° C.)
[13] BHST of 200° F. (93.3° C.)
[14] BHST of 236° F. (113.3° C.)
[15] BHST of 250° F. (121.1° C.)
[16] BHST of 128° F. (53.3° C.)
[17] BHST of 176° F. (80° C.)
*Signifies "not taken"

A study of the data in Table III above clearly illustrates the superior and beneficial results arising from the novel slurries prepared using our novel cement compositions. In Run No. 1 wherein the aqueous cement slurry was prepared using only cement, water and a dispersant, the fluid loss, the amount of free water, the API viscosity and the yield point were all in the unacceptable ranges for a satisfactory cement. It can be seen that when a polysaccharide produced as a result of microbial action, namely xanthan gum, was added to the satisfactory composition of Run No. 2 in Run No. 3, the fluid loss and percent free water were not adversely affected, but the total thickening time was increased and the compressive strength of the cement was substantially improved. When Run No. 4. is compared with Run No. 3, it can be seen that even at lower temperatures and with a decreased amount of the polysaccharide, the desirable features of the cement are still maintained. Runs Nos. 5, 6, 7 and 8 show that the absence or presence of KCl and the variation in the amount of water used to prepare the cement slurry do not adversely affect the desired properties of the cement. In Run No. 9, the dispersant used was a sodium naphthalene sulfonate formaldehyde condensation product, while in Run No. 10 the corresponding potassium compound was used. In each case a satisfactory cement was obtained. Run No. 11 shows that the presence of a high temperature lignin in the cement slurry does not adversely affect the desired properties of the cement. Runs Nos. 12, 13 and 14 further show that the presence of various salts, KCl, those present in sea water or $CaCl_2$, also do not adversely affect the desired characteristics of the cement prepared herein. Runs Nos. 15, 16, 17 and 18 show that the cement slurries herein can be prepared using various kinds of cements. When in Run No. 19 a commercially available cement additive was used herein in place of the defined components of the novel aqueous cement slurry, for example, in Run No. 12, we obtained a much higher fluid loss. Runs Nos. 20 to 23 demonstrate that our novel aqueous slurries are eminently suitable for use in hesitation squeezing wherein a relatively long thickening time is required, even at high temperatures. Thus, in each of Runs Nos. 5, 21 and 22 the composition of the aqueous slurries were the same. However, the temperatures in Runs Nos. 21 and 22 were significantly higher than in Run No. 5. We had expected that the total thickening time at the higher temperatures in Runs Nos. 21 and 22 would be lower than in Run No. 5 because of the effect of the higher temperatures. Unexpectedly, the total thickening times in Runs Nos. 21 and 22 were significantly higher than in Run No. 5. Even in Run No. 23 wherein the temperature was still higher than in Runs 20, 21 and 22, the total thickening time was within satisfactory limits.

We have tested the cement prepared using the aqueous slurry of Run No. 9 for shrinkage by curing the same at a temperature of 230° F. (110° C.) and a pressure of 3000 pounds per square inch gauge (20,682 kPa) for seven days. The amount of shrinkage in the vertical dimension amounted to less than 1.0 percent. The same cement without the additives of Run No. 9 showed a shrinkage of about 12 percent in the vertical dimension.

We have further tested a cement prepared using an aqueous cement slurry in accordance with the claimed invention herein to determine the time required for it to reach its final compressive strength. The aqueous slurry was prepared using 320 cc of water, 800 grams of Class H cement, 0.40 weight percent of the same hydroxyethylcellulose ether used above, 0.08 weight percent of carboxymethylhydroxyethylcellulose ether, 0.08 weight percent of the same xanthan gum used above, and 1.087 weight percent of DAXAD 19, all based on the weight of the dry cement, and 3.45 weight percent of KCl, based on the weight of water, at 230° F. (110° C.) at 3000 pounds per square inch gauge (20,682 kPa). The following Table IV shows how quickly the cement prepared from the above reached its final level of compressive strength.

TABLE IV

| Time Hours:Minutes | Compressive Strength, | |
|---|---|---|
| | PSI | (kPa) |
| 5:38 | 50 | (344) |
| 6:23 | 500 | (3,440) |
| 12:00 | 2000 | (13,788) |
| 24:00 | 2500 | (17,235) |
| 36:00 | 2750 | (18,958) |
| 48:00 | 2750 | (18,958) |
| 60:00 | 2753 | (18,979) |
| 72:00 | 2753 | (18,979) |
| 96:00 | 2753 | (18,979) |

The above compressive strengths were obtained using the Ultrasonic Cement Analyzer manufactured by the Haliburton Co.

Obviously, many modifications and variations of the invention, as hereinabove set forth, can be made without departing from the spirit and scope thereof, and therefore only such limitations should be imposed as are indicated in the appended claims.

We claim:

1. A novel cement composition for the preparation of a novel aqueous slurry useful in cementing casing in the borehole of a well comprising (1) cement, (2)(a) a hydroxyethylcellulose ether or (2)(b) a mixture of a hydroxyethylcellulose ether and a hydroxypropylcellulose ether, (3) at least one polysaccharide produced as a result of microbial action and (4) a dispersant.

2. The composition of claim 1 comprising (1) cement, (2) a hydroxyethylcellulose ether, (3) at least one polysaccharide produced as a result of microbial action and (4) a dispersant.

3. The composition of claim 2 wherein said hydroxyethylcellulose ether has a viscosity above about 200 centipoises when measured in a five weight percent aqueous solution, but less than about 6000 centipoises when measured in a one weight percent aqueous solution.

4. The composition of claim 2 wherein said hydroxyethylcellulose ether has a viscosity in the range of about 1000 to about 10,000 centipoises when measured in a two weight percent aqueous solution.

5. The composition of claim 1 comprising (1) cement, (2) a mixture of hydroxyethylcellulose ether and a hydroxypropylcellulose ether, (3) at least one polysaccharide produced as a result of microbial action and (4) a dispersant.

6. The composition of claim 5 wherein said hydroxyethylcellulose ether has a viscosity above about 200 centipoises when measured in a five weight percent aqueous solution, but less than about 6000 centipoises when measured in a one weight percent aqueous solution and said hydroxypropylcellulose ether has a viscosity above about 100 centipoises when measured in a two weight percent aqueous solution, but less than about 10,000 centipoises when measured in a one weight percent aqueous solution.

7. The composition of claim 5 wherein said hydroxyethylcellulose ether has a viscosity in the range of about 1000 to about 10,000 centipoises when measured in a two weight percent aqueous solution and said hydroxypropylcellulose ether has a viscosity of about 1000 to about 3000 centipoises when measured in a one weight percent aqueous solution.

8. The composition of claim 6 wherein said hydroxypropylcellulose ether is present in an amount up to about 50 weight percent based on the total weight of the hydroxyalkylcellulose ethers.

9. The composition of claim 6 wherein said hydroxypropylcellulose ether is present in an amount ranging from about five to about 20 weight percent based on the total weight of the hydroxyalkylcellulose ethers.

10. The composition of claim 7 wherein said hydroxypropylcellulose ether is present in an amount up to about 50 weight percent based on the total weight of the hydroxyalkylcellulose ethers.

11. The composition of claim 7 wherein said hydroxypropylcellulose ether is present in an amount ranging from about five to about 20 weight percent based on the total weight of the hydroxyalkylcellulose ethers.

12. The composition of claim 1 wherein the degree of substitution on said hydroxyalkylcellulose ethers is in the range of about 0.5 to about 3.0.

13. The composition of claim 1 wherein the degree of substitution on said hydroxyalkylcellulose ethers is in the range of about 0.9 to about 2.8.

14. The composition of claim 1 wherein the molar substitution of said hydroxyalkylcellulose ethers is in the range of about 0.5 to about 10.0.

15. The composition of claim 1 wherein the molar substitution of said hydroxyalkylcellulose ethers is in the range of about 1.0 to about 6.0.

16. The composition of claim 1 wherein the cement is selected from API Classes A through J.

17. The composition of claim 1 wherein the cement is selected from API Classes H, G, C and J.

18. The composition of claim 1 wherein the cement is a Class H cement.

19. The composition of claim 1 wherein said dispersant is an anionic dispersant.

20. The composition of claim 1 wherein said dispersant is a sulfonic acid derivative of an aromatic or aliphatic hydrocarbon.

21. The composition of claim 1 wherein said dispersant is a polynaphthalene sulfonate.

22. The composition of claim 1 wherein said dispersant is a sodium naphthalene sulfonate formaldehyde condensation product.

23. The composition of claim 1 wherein said dispersant is a potassium naphthalene sulfonate formaldehyde condensation product.

24. The composition of claim 1 wherein said polysaccharide is an extracellular hydrophilic colloidal material.

25. The composition of claim 1 wherein said polysaccharide has a molecular weight in the range of about 10,000 to about 10,000,000.

26. The composition of claim 1 wherein said polysaccharide has a molecular weight in the range of about 1,000,000 to about 3,000,000.

27. The composition of claim 1 wherein said polysaccharide has been obtained as a result of the microbial action of the bacteria xanthomonas begoniae, xanthomonas campestris, xanthomonas caratae, xanthomanas hederae, xanthomonas incanae, xanthomonas malvacearum, xanthomonas oryzae, xanthomonas papavericola, xanthomonas phaseoli, xanthomonas pisi, xanthomonas translucens, xanthomonas vasculorum, xanthomonas vesicatoria, scleratium glucanicum, alcaligenes faecalis, azotobacter vinelandii, aureobasidium pullulans, beijerinckia indica, etc.

28. The composition of claim 1 wherein said polysaccharaide has been obtained as a result of the microbial action of the bacterium xanthomonas campestris.

29. The composition of claim 1 wherein said polysaccharide is xanthan gum.

30. The composition of claim 1 wherein said cement composition contains from about 0.01 to about 0.6 weight percent of said hydroxyalkylcelluloses, from about 0.01 to about 0.6 weight percent of said polysaccharide and from about 0.01 to about 3.0 weight percent of said dispersant, based on the weight of the cement.

31. The composition of claim 1 wherein said cement composition contains from about 0.1 to about 0.5 weight percent of said hydroxyalkylcellulose ether, from about 0.02 to about 0.2 weight percent of said polysaccharide and from about 0.1 to about 2.0 weight percent of said dispersant, based on the weight of the cement.

32. The composition of claim 1 wherein the weight ratio of said dispersant to total hydroxyalkylcellulose ether is in the range of about 10:1 to about 1:5.

33. The composition claim 1 wherein the weight ratio of said dispersant to total hydroxyalkylcellulose ether is in the range of about 5:1 to about 1:1.

34. An aqueous cement slurry prepared using the novel cement composition of claim 1 containing from about 0.01 to about 0.6 weight percent of said hydroxyalkylcellulose ethers, from about 0.01 to about 0.6 weight percent of said polysaccharide, from about 0.01 to about 3.0 weight percent of said dispersant and from about 25 to about 80 weight percent of water, based on the weight of the cement.

35. An aqueous cement slurry prepared using the novel cement composition of claim 1 containing from about 0.1 to about 0.5 weight percent of said hydroxyalkylcellulose ether, from about 0.02 to about 0.2 weight percent of said polysaccharide, from about 0.1 to about 2.0 weight percent of said dispersant and from about 35 to about 70 weight percent of water, based on the weight of the cement.

36. The aqueous slurry of claim 34 that additionally contains up to about seven weight percent of KCl by weight of water.

37. The aqueous slurry of claim 35 that additionally contains from about one to about five weight percent of KCl by weight of water.

38. A method of cementing casing in the borehole of a well comprising suspending the casing in the borehole, pumping downwardly into said casing an aqueous cement slurry comprising (1) water, (2) cement, (3) (a) a hydroxyethylcellulose ether or (3)(b) a mixture of a hydroxyethylcellulose ether and a hydroxypropylcellulose ether, (4) at least one polysaccharide produced as a result of microbial action, and (5) a dispersant, then circulating said cement slurry upwardly into the annulus surrounding said casing, continuing said circulation until said slurry fills that portion of the annular space desired to be sealed and then maintaining said slurry in place until the cement sets.

39. The process according to claim 38 wherein said aqueous slurry comprises (1) water, (2) cement, (3) a hydroxyethylcellulose ether, (4) at least one polysaccharide produced as a result of microbial action, and (5) a dispersant.

40. The process according to claim 39 wherein said hydroxyethylcellulose ether used to prepare said aqueous slurry has a viscosity of above about 200 centipoises when measured in a 5 weight percent aqueous solution, but less than about 6,000 centipoises when measured in a 1 weight percent aqueous solution.

41. The process according to claim 39 wherein the hydroxyethylcellulose ether in said aqueous slurry has a viscosity in the range of about 1,000 to about 10,000 centipoises when measured in a 2 weight percent aqueous solution.

42. The process according to claim 38 wherein said aqueous slurry comprises (1) water, (2) cement, (3) a mixture of hydroxyethylcellulose ether, and a hydroxypropylcellulose ether, (4) at least one polysaccharide produced as a result of microbial action, and (5) a dispersant.

43. The process according to claim 42 wherein said hydroxyethylcellulose ether used in said aqueous slurry has a viscosity above about 200 centipoises when measured in a 5 weight percent aqueous solution, but less than about 6,000 centipoises when measured in a 1 weight percent aqueous solution and said hydroxypropylcellulose ether in said aqueous slurry has a viscosity above about 100 centipoises when measured in a 2 weight percent aqueous solution, but less than about 10,000 centipoises when measured in a 1 weight percent aqueous solution.

44. The process according to claim 42 wherein said hydroxyethylcellulose ether has a viscosity in the range of about 1,000 to about 10,000 centipoises when measured in a 2 weight percent aqueous solution and said hydroxypropylcellulose ether has a viscosity of about 1,000 to about 3,000 centipoises when measured in a 1 weight percent aqueous solution.

45. The process according to claim 38 that wherein said aqueous slurry said hydroxypropylcellulose ether is present in an amount of about 50 weight percent based on the total weight of the hydroxyalkylcellulose ethers.

46. The process according to claim 38 that wherein said aqueous said hydroxypropylcellulose ether is present in an amount ranging from about 5 to about 20 weight percent based on the total weight of the hydroxyalkylcellulose ethers.

47. The process according to claim 44 wherein said aqueous slurry said hydroxypropylcellulose ether is present in an amount up to about 50 weight percent based on the total weight of the hydroxylalkylcellulose ethers.

48. The process according to claim 44 wherein said aqueous slurry said hydroxypropylcellulose ether is present in an amount ranging from about 5 to about 20 weight percent based on the total weight of the hydroxyalkylcellulose ethers.

49. The process according to claim 38 wherein the hydroxyalkylcellulose ethers in said aqueous slurry have a degree of substitution in the range of about 0.5 to about 3.0.

50. The process according to claim 49 that wherein in said aqueous slurry the degree of substitution of said hydroxyalkylcellulose ethers in said aqueous slurry is in the range of about 0.9 to about 2.8.

51. The process according to claim 38 wherein the molar substitution of said hydroxyalkylcellulose ethers in said aqueous slurry is in the range of about 0.5 to about 10.0.

52. The process according to claim 51 wherein the molar substitution of said hydroxyalkylcellulose ethers is in the range of about 1.0 to about 6.0.

53. The process according to claim 38 wherein the cement in said aqueous slurry is selected from API Classes A-J.

54. The process according to claim 53 wherein the cement used in said aqueous slurry is a Class H cement.

55. The process according to claim 38 wherein said dispersant in said aqueous slurry is an anionic dispersant.

56. The process according to claim 38 wherein said dispersant in said aqueous slurry is a sulfonic acid derivative of an aromatic or aliphatic hydrocarbon.

57. The process according to claim 38 wherein said polysaccharide in said aqueous slurry is an extracellular hydrophilic colloidal material.

58. The process according to claim 38 wherein said polysaccharide in said aqueous slurry has a molecular weight in the range of about 10,000 to about 10 million.

59. The process according to claim 58 that wherein said polysaccharide has amolecular weight in about 1 million to about 3 million.

60. The process according to claim 38 wherein said polysaccharide in said aqueous slurry has been obtained as a result of microbial action of the bacteria xanthormonas begoniae, xanthomonas campestris, xanthomonas caratae, xanthomonas hederae, xanthomonas incanae, xanthomonas malvacearum, xanthomonas oryzae, xanthomonas papavericola, xanthomonas phaseoli, xanthomonas pisi, xanthomonas translucens, xanthomonas vasculorum, vanthomonas vesicatoria, scleratium glucanicum, alcaligenes faecalis, azotobacter vinelandii, aureobasidium pullulans, beijerinckia indica, etc.

61. The process according to claim 60 wherein the polysaccharide in said aqueous slurry has been obtained as a result of the microbial action of the bacterium xanthomonas campestris.

62. The process according to claim 60 wherein said polysaccharide in said aqueous slurry is xanthan gum.

63. The process according to claim 38 wherein the said aqueous slurry contains from about 0.01 to about 0.6 weight percent of said hydroxyalkylcellulose, from about 0.01 to about 0.6 weight percent of said polysaccharide and from about 0.01 to about 3.0 weight percent of said dispersant, all based on the weight of the cement.

64. The process according to claim 38 wherein the cement composition contains from about 0.1 to about 0.5 weight percent of said hydroxyalkylcellulose ether, from about 0.02 to about 0.2 weight percent of said polysaccharide and from about 0.1 to about 2.0 weight percent of said dispersant, all based on the weight of the cement.

65. The process according to claim 38 wherein the weight ratio of said dispersant to total hydroxyalkylcellulose ethers in said cement composition is in the range of about 10:1 to about 1:5.

66. The process according to claim 65 wherein the weight ratio of said dispersant to said total hydroxyalkylcellulose ethers is in the range of about 5:1 to about 1:1.

67. The process according to claim 38 wherein the amount of water in said aqueous slurry is from 25 to 80 weight percent, based on the weight of the cement.

68. The process according to claim 67 wherein the weight percent of water in said aqueous slurry is from 35 to about 70, based on the weight of cement.

69. The process according to claim 38 wherein said aqueous cement slurry contains in addition from about 1 to about 5 weight percent of KCl based on the weight of water.

70. The process in accordance with claim 67 wherein said aqueous cement slurry contains in addition from about 1 to about 5 weight percent of KCl by weight of water.

71. The process according to claim 38 wherein said aqueous cement slurry additionally contains carboxymethylhydroxyethylcellulose ether.

72. The process according to claim 38 wherein the passage of said aqueous cement slurry through said casing is preceded by passage therethrough of a lead-scavenger quantity of cement slurry.

73. The process according to claim 38 wherein said borehole is slanted from the vertical.

* * * * *